Aug. 25, 1925.

A. G. MERRIMAN 1,551,259

MOTION PICTURE CABINET

Filed April 19, 1924

2 Sheets-Sheet 1

WITNESSES

INVENTOR
A. G. MERRIMAN,
BY
ATTORNEYS

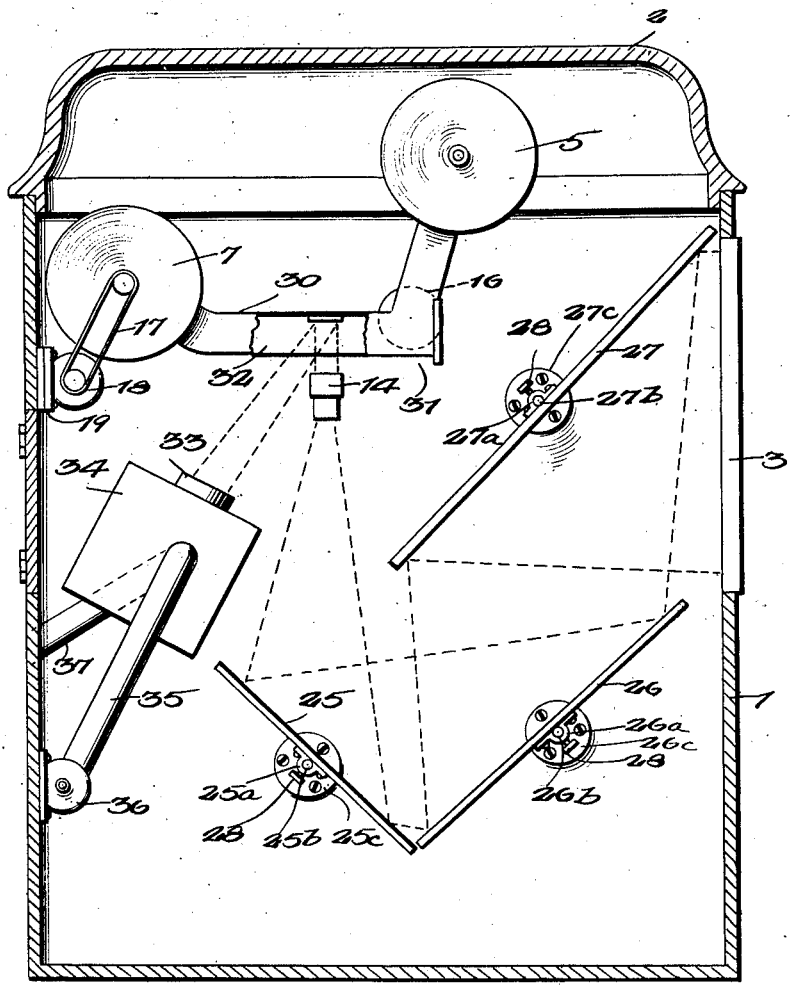
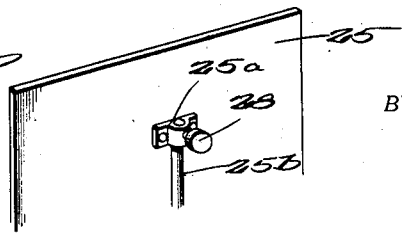

Patented Aug. 25, 1925.

1,551,259

UNITED STATES PATENT OFFICE.

ARTHUR GATES MERRIMAN, OF MEMPHIS, TENNESSEE.

MOTION-PICTURE CABINET.

Application filed April 19, 1924. Serial No. 707,751.

*To all whom it may concern:*

Be it known that I, ARTHUR G. MERRIMAN, a citizen of the United States, and resident of Memphis, in the county of Shelby and State of Tennessee, have invented certain new and useful Improvements in Motion-Picture Cabinets, of which the following is a specification.

My invention relates to improvements in motion picture cabinets, and it consists in the combinations, constructions and arrangements herein described and claimed.

The present invention contemplates the provision of an improvement over the motion picture cabinet which is disclosed in Letters Patent of the United States 1,460,071, granted to me June 26, 1923, for a cabinet case having a translucent screen as a part of a vertical wall thereof and having a novel arrangement of light emitting elements, film supporting and feeding means and means for utilizing rays of light from the light emitting element and the film to project on the screen images of pictures on the film.

An object of the present invention is to provide an improved motion picture cabinet of the character described in which the component parts and particularly the elements of the apparatus for projecting pictures on the screen which require manipulation or manual actuation during the operation of the device are so disposed as to permit the convenient operation of the device without there being any necessity of the operator assuming a strained or awkward position in order to operate the device.

A further object of the invention is to provide a motion picture cabinet having a translucent screen in a wall thereof and means for causing the rays of light for projecting the picture on the screen to travel a relatively great distance in a cabinet of a given size in order to pass from the projecting lens of the apparatus to the screen, whereby a picture of relatively large size will be projected on the screen.

A still further object of the invention is to provide in a cabinet of the character described an improved light transmitting means which will insure the projection on the screen of a clear and sharply defined picture.

Other objects and advantages will be apparent from the following description, considered in conjunction with the accompanying drawings, in which—

Figure 1:
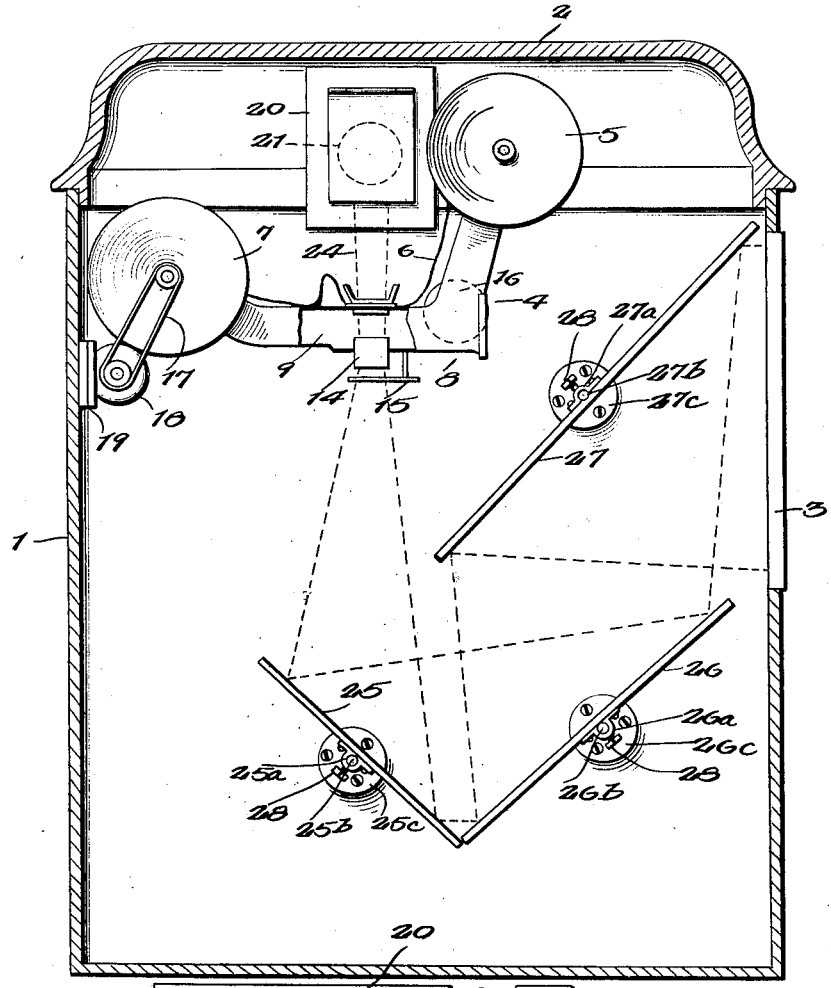
Figure 2:
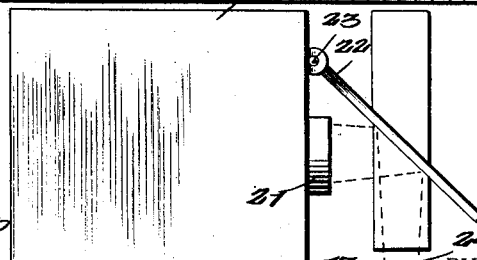
Figure 2:
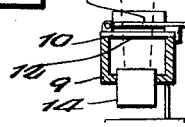

Figure 1 is a vertical section through a motion picture cabinet embodying the present invention, Figure 2 is a view, mainly in side elevation and partly in vertical section showing certain of the elements of the motion picture apparatus of the cabinet exhibited in Figure 1, Figure 3 is a view similar to Figure 1, showing the second form of cabinet which also is formed in accordance with the present invention, Figure 4 is a fragmentary perspective view of a portion of a light reflecting mirror and means comprised in the device for supporting the mirror for swinging movement.

A motion picture cabinet of the character described is intended primarily for disposition in a parlor or living room of a dwelling house for use as a source of entertainment in the home. It therefore is desirable that the apparatus of the device which is operable to cause the projection of the pictures on a screen which forms a portion thereof or is a panel in the side wall of the cabinet be adapted to be conveniently operated by one of a group of persons in the room in which the cabinet is disposed. It also is desirable that the motion picture cabinet shall be so proportioned as to be suitable for use as an article of furniture within the home and it also is desirable that the picture which is projected on the screen be enlarged as much as possible without undue enlargement of the cabinet itself. A motion picture cabinet having the desirable features just enumerated is contemplated by the present invention as will be understood from the following description.

In Figure 1, I show a cabinet 1 having a lid 2 raisable from the body of the base to permit access to the interior of the cabinet and preferably hinged to the body of the cabinet as is usual. The cabinet is provided with a screen 3 in a vertical wall thereof, the screen being formed of a suitable translucent material. Motion picture apparatus generally designated at 4 is disposed within the case 1. The motion picture apparatus includes a reel 5 for holding the ordinary transparent motion picture film and a reel 7 onto which the film 6 may be wound from the reel 5. The reels 5 and 7 are supported in the upper part of the cabinet 1 in any suitable known manner. The film guiding and supporting structure indicated at 8 is supported within the case 1 and has a substantially horizontal portion 9 disposed between the reels 5 and 7 and provided with a top plate 10 on which the film slides in passage from the reel 5 to the reel 7. A hinged retaining element 11 carried by the member 9 serves to prevent displacement of the film laterally or vertically upward from a portion of the horizontal support 9 that is provided with a vertical opening at 12 in alignment with a vertical opening at 13 in the retaining member 11 and with a projecting lens 14 which is secured in an opening in the lower part of the portion 9 of the frame 8. The projecting lens 14 is vertically disposed and a revolving shutter 15 may be arranged in position to swing at a certain time during its travel across the lower end of the projecting lens. A driving motor 16 for operating the moving parts of the apparatus with the exception of the rewind reel 7 is indicated at 16 and may have suitable driving connection, not shown, with the moving parts of the apparatus.

The rewind reel 7 may be rotated by a belt connection 17 with a rewind motor 18 which may be supported on a bracket 19 attached to the body of the case 1.

The parts described so far are shown more or less diagrammatically in Figure 1 since, with the exception of the provision of a supporting and guiding frame 8 having a horizontal portion 9, these parts are fully disclosed in my aforesaid patent.

A lamp housing 20 is disposed within the upper part of the cabinet 1 above the horizontal portion 9 of the frame 8. The lamp housing 20 of course is adapted for the reception of an incandescent lamp, not shown, or other source of light and is provided with a lateral outlet in which is disposed a condensing lens 21 through which rays of light from the light emitting element within the housing will pass. A mirror 22 is hingedly supported at its upper end, as at 23 on the lamp housing 20 and is adapted to swing about a horizontal axis to position to intersect the rays of light which pass through the condenser lens 21. The rays of light striking the mirror 22 are reflected downwardly as indicated by the dash lines at 24 in Figures 1 and 2 through the vertically aligned openings 13 and 12 and through the portion of the transparent film 6 that is disposed between the openings 13 and 12 into and through the projecting lens 14.

A set of mirrors 25, 26 and 27 respectively is arranged within the case 1 for reflecting the rays of light which pass from the projecting lens 14 upon the screen 3 and for causing said rays of light to travel a relatively great distance in passing from the projecting lens 14 to the screen 3 in a cabinet case of a given size so that the picture which is projected on the screen will be relatively large. Each of the mirrors 25, 26 and 27 is supported to swing about a horizontal axis, as by being provided with a sleeve attached to the back of the mirror and rotatably supported on a horizontal rod-like arm of a bracket which is attached to one of the vertical walls of the cabinet 1. The sleeves for the respective mirrors 25, 26 and 27 are designated 25$^a$, 26$^a$ and 27$^a$ respectively and are rotatably supported on horizontal rod-like arms 25$^b$, 26$^b$ and 27$^b$ of brackets 25$^c$, 26$^c$ and 27$^c$ respectively. Each of the sleeves may be locked to the rod-like bracket arm on which it is supported by means of a set screw 28.

The respective brackets 25$^c$, 26$^c$ and 27$^c$ are so disposed within the cabinet 1 in relation to one another that the mirrors carried thereby can be adjusted in respect to one another so that the rays of light from the projecting lens 14 will strike the base of the mirror 25 at an oblique angle and will be deflected against the base of the mirror 26 also at an oblique angle, and thence against the face of the mirror 27 and from the latter to the screen 3. The rays of light of course diverge during their passage from the projecting lens 14 to the screen 3 and a relatively large picture therefore will be projected on the screen.

The mirrors 25, 26 and 27 preferably are "first surface mirrors" or in other words are plates of metal or a like material having a highly polished reflecting surface and are preferably not of glass, provided with a backing of quick silver. The pictures which are projected onto the screen 3 thus are clear and sharply defined and are free from the haziness which is caused by the use of a glass mirror having a backing of quick silver as a result of reflections both by the surface of the glass and by the backing of the glass.

From the foregoing description of the various parts of the device, the operation thereof may be readily understood. The case 1 is of sufficient height that the motion picture apparatus can be positioned within convenient reach of the hand of a person of average height when the lid 2 of the case has been raised without there being any necessity of the person stooping over or assuming an awkward or strained position in order to adjust the film reel 5 or the rewind reel 7 or to effect operation of the motion picture apparatus in the usual manner. This desirable result is accomplished by placing the motion picture apparatus in the upper part of the case 1 and also by arranging the respective reels 5 and 7 substantially in the same level as indicated. The motors 15 and 18 preferably are electric motors and the operation thereof may be controlled by switches, not shown, of ordinary construction which may be positioned at the upper edge of the case 1.

The arrangement of the mirrors 25, 26 and 27 in conjunction with the projecting lens 14 and the screen 3 insures the projection onto the screen of a clear, sharply defined relatively large picture in a cabinet case of a given size.

The form of the device which is exhibited in Figure 3 differs from that described in the foregoing in the following particulars. The horizontal portion 30 of a film supporting and guiding member 31 of the apparatus is open at its lower side, as at 32 to admit rays of light from the condenser lens 33 to a portion of an opaque film which is being moved along the portion 32 of the supporting member 31 from the film reel 5 to the rewind reel 7. A condenser lens 33 is carried by the lamp housing 34 which is supported within the case 1, as by means of a delivery pipe 35 leading from the motor driven blower mechanism 36 attached to a wall of the case and a cooling exhaust pipe 37 so that the rays of light passing through the condenser lens 33 will strike the exposed portion of the opaque film at an oblique angle and will be deflected therefrom through the projecting lens 14.

The same reference characters have been used to indicate like parts of the two forms of the device which are illustrated in the drawing. The operation of the form of the device which is illustrated in Figure 3 is identical in essential respects with the operation of the form of the device which is illustrated in Figure 1.

Obviously, the invention is susceptible of embodiment in forms other than those which are illustrated in the drawing and I therefore consider as my own all such modifications and adaptations of the forms thereof herein described as fairly fall within the scope of the appended claims.

I claim:—

1. In a motion picture cabinet, a cabinet case having a body open at its upper end and having a lateral translucent screen, a motion picture apparatus disposed within the upper part of the body of the case in position to be conveniently accessible through the opening in the upper end of the case, and having a projecting lens arranged to project rays of light downward within the case, and a series of mirrors arranged within the case for reflecting the rays of light which pass downwardly from the projecting lens so that such rays of light will pass horizontally to the screen, each of said mirrors being a "first surface" mirror and being supported within the case to swing about a horizontal axis.

2. In a motion picture cabinet, a cabinet case having a body open at its upper end and having a lateral translucent screen, a motion picture film reel supported in the upper part of the cabinet case, a film re-wind reel also supported in the upper part of the case out of vertical alinement with said first named reel, a film guiding and supporting structure supported in the upper part of the cabinet case, said film guiding and supporting structure including a substantially horizontal member provided with a top plate on which the film slides longitudinally in its passage from said first named reel to said re-wind reel and a retaining element hinged to the top plate for cooperating with the latter to prevent lateral or vertical displacement of the film from the top plate, means for cooperating with said film to project pictures downward in the cabinet case, and means within the case for reflecting said pictures onto the screen.

ARTHUR GATES MERRIMAN.